United States Patent [19]
Campbell

[11] Patent Number: 5,895,537
[45] Date of Patent: Apr. 20, 1999

[54] SONIC WELDED GAS MASK AND PROCESS

[76] Inventor: Richard G. Campbell, 130 S. Klug Cir., Corona, Calif. 91720

[21] Appl. No.: 08/947,870

[22] Filed: Oct. 9, 1997

[51] Int. Cl.$^6$ ...................................................... B32B 31/16
[52] U.S. Cl. .................... 156/73.1; 156/290; 156/308.4; 264/445
[58] Field of Search .......................... 128/201.19, 206.12, 128/206.21, 206.24, 206.28; 156/73.1, 290, 292, 308.4, 209.6, 580.1, 580.2; 264/442, 443, 445

[56] References Cited

U.S. PATENT DOCUMENTS

| | | | |
|---|---|---|---|
| H883 | 2/1991 | Little et al. | 128/201.17 |
| 2,164,330 | 7/1939 | Katz et al. | 128/141 |
| 3,181,531 | 5/1965 | Angioletti | 128/141 |
| 3,220,408 | 11/1965 | Silverberg | 128/141 |
| 4,736,740 | 4/1988 | Parker et al. | 128/201.19 |
| 4,799,263 | 1/1989 | Banziger et al. | 381/94 |
| 4,885,796 | 12/1989 | Loftus et al. | 455/11 |
| 4,886,058 | 12/1989 | Brostrom et al. | 128/206 |
| 4,905,683 | 3/1990 | Cronjaeger | 128/202 |
| 4,926,853 | 5/1990 | Meunier | 128/201 |
| 4,960,121 | 10/1990 | Nelson et al. | 128/206 |
| 4,961,420 | 10/1990 | Cappa et al. | 128/207 |
| 5,279,286 | 1/1994 | Chen | 128/201.19 |
| 5,572,990 | 11/1996 | Berlin | 128/201.19 |
| 5,605,145 | 2/1997 | Hannah et al. | 128/201.19 |
| 5,630,412 | 5/1997 | Dubruille et al. | 128/206 |

Primary Examiner—James Sells
Attorney, Agent, or Firm—Paul H. Ware

[57] ABSTRACT

A sonic welded gas mask and the process for fabricating the mask. The facepiece of the mask provides apertures, appropriately shaped and dimensioned to receive gas mask components for sealing therein. The elastomeric material of the facepiece of the mask is captured between sealing elements and secured therebetween by a sonic welding process. The method of fabrication described attaches and positively seals the elements into the mask. Direct voice communication and alternatively, electronic voice communication may be provided between a user and the external environment.

5 Claims, 5 Drawing Sheets

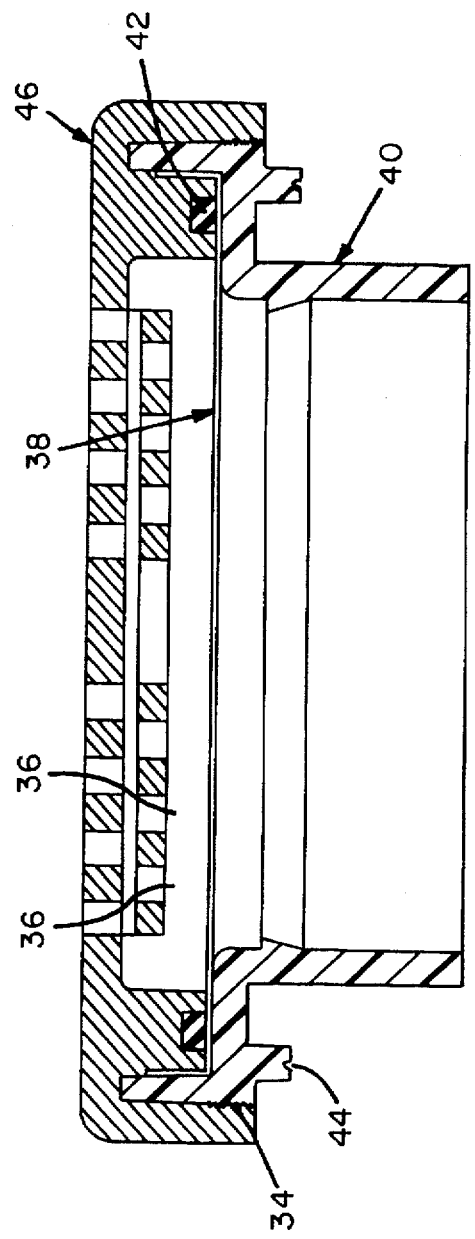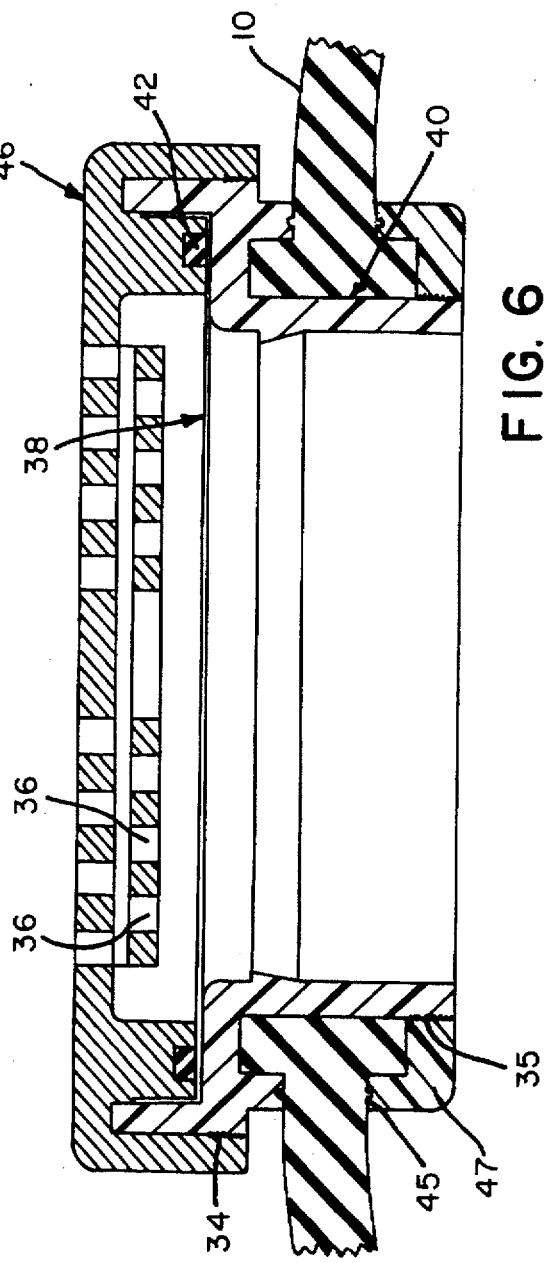

SONIC WELDED GAS MASK AND PROCESS

The U.S. Government has a paid-up license in this invention and the right in limited circumstances to require the patent owner to license others on reasonable terms as provided for by the terms of Contract No. DAAA15-92-C-0082 awarded by The Army.

BACKGROUND OF THE INVENTION

1. Field of the Invention

This invention relates generally to gas masks and more particularly, the present invention relates to the provision of improved methods of securing components to the base facepiece of a gas mask. Thus, the present invention is directed to a combination of all elements that cooperate to provide a complete gas mask system as fabricated by the method disclosed.

2. Description of Related Art

Gas masks are well known in the prior art and have been improved over the years by many ingenious innovations marked by fresh and unusual approaches. While presently available gas masks can and do operate in the environments for which they were contrived, communication by voice has been difficult, leaks have appeared in the masks, components have not been firmly secured to the facepieces, and among other things, the devices have not been tamper proof. Many different innovative devices have been employed in the attempts to solve the problems presented. Some of these have either generated new problems or only partially solved the current problems, or both. Many of these conventional devices have thus met special needs as presented by specific difficulties and have, therefore, served narrow purposes. Some of these prior art devices, among other disadvantages, have been unreliable and unpredictable in operation under continued use and have been expensive and complicated to manufacture. Prior art patents that were brought to the attention of the applicant through a novelty search conducted in the United States Patent and Trademark Office have been described in what immediately follows.

The prior art includes:

U.S. Pat. No. 2,164,330, issued Jul. 4, 1939, to S. H. Katz et al. for FULLY MOLDED GAS MASK FACEPIECE. In addition to fabrication by a method of molding, the device provided for prevention of condensation on the lenses and thus alleviated impaired vision due to breath condensation. Improved voice transmission through the faceplate was also accomplished.

U.S. Pat. No. 3,181,531, issued May 4, 1965, to A. Angioletti for RUBBER GAS MASK. Weight reduction through single piece molding along with the means for inhalation and exhalation were the main thrusts of the inventive device.

U.S. Pat. No. 3,220,408, issued Nov. 30, 1965 to C. G. Silverberg for FACE MASKS. The specific issues resulting from radioactive fallout were contemplated along with difficulties resulting from leaks about seals between the lenses, the other fittings and the body portion of the masks. The capability of cleaning the mask after use in a hostile environment was of major concern to the inventor.

U.S. Pat. No. 4,886,058, issued Dec. 12, 1989 to G. M. Brostrom et al. for FILTER ELEMENT. The patent taught a filter element to be attached directly to a face mask thus to become a part integral therewith. While not contemplating a total gas mask system, the patent mentions ultrasonic welding as a method of bonding.

U.S. Pat. No. 4,905,683, issued Mar. 6, 1990, to R. Cronjaeger for RESPIRATOR MASK FOR POSITIVE PRESSURE RESPIRATOR EQUIPMENT. This invention was concerned mainly with the prevention of the escape of respiratory gas of large oxygen content into the surrounding environment. A primary thrust, therefore, was directed to leak detection from the interior of the mask.

U.S. Pat. No. 4,926,853, issued May 22, 1990, to P. P. Meunier for GAS MASK NOSE OCCLUDER. This innovative device described an in-mask means for occluding the nostrils of a user so as to perform what the inventor referred to as the valsalva manoeuvre. This, it is explained, is to be used to equilibrate the internal air pressure in the sinus cavities and ears with the atmospheric pressure. In operation, internal prong members allow a user to pinch the nostrils together so as to accomplish the equilibration.

U.S. Pat. No. 4,960,121, issued Oct. 2, 1990 to J. E. Nelson et al. for HALF-FACE MASK ASSEMBLY. This patent teaches a novel head harness as a primary thrust and interchangeable face seals for use with different sized faces. Claimed as a primary advantage is the easy donning and doffing of the apparatus. Ultrasonic welding is mentioned as a means to join connectors to a hard shell.

U.S. Pat. No. 4,961,420, issued Oct. 9, 1990 to G. Cappa et al. for GAS MASK FOR OPERATION IN CONTAMINATED AREAS. The inventive device described contemplates the problems involved with inhalation and exhalation; voice communication from a user to others; and the capability to receive drink and nourishing liquids without removing the mask, among other things.

U.S. Pat. No. 5,630,412, issued May 20, 1997, to A. Dubruille et al. for PROTECTIVE EQUIPMENT FOR THE HEAD COMPRISING A BREATHING MASK AND AN OPTICAL SCREEN. This innovative device has been described as primarily for use in aviation when loss of pressure is encountered and including connection to a source of breathing gas. It is adaptable for rapid application under emergency conditions.

These prior art devices are commendable and show a truly creative spirit for their times and intended applications. The inventors and their inventions have contributed remarkably to the technology involved. However, these prior art structures do not include those combined elements of the invention described and submitted herewith that provide greater facility of use, economy of fabrication, higher reliability and ingenious arrangement of components that make the instant invention the high culmination in the art of gas mask technology to date.

It would thus be a great advantage to the art to provide means for securing components to the base facepiece of the gas mask by means resistant to chemical attack when employed in environments containing substances capable of attacking conventional bonding agents, e.g., glues and cements such as are traditionally used in joining and bonding operations.

Another great advantage would be realized through the provision of a bonding method and resulting seal between components and the base face piece that is free of leaks, including powder and fluid leaks, both liquid and gaseous.

A further desirable advantage would be to provide an improved and convenient means of voice communication between users of the gas mask.

A still further beneficial advantage to users and manufacturers of gas masks would manifest itself in the provision of an improved grouping of components that would result in greater facility of fabrication, lower cost of manufacture and overall weight reduction.

SUMMARY OF THE INVENTION

In accordance with the instant invention, among other things, there is provided a sonic welded gas mask and method for the fabrication thereof that eliminates the use of traditional bonding cements and glues. The bonding method contemplated by the present invention provides freedom from passage of matter either into or out from the gas mask system. The method of assembly as will be shown, allows voice vibrations to be transmitted from the internal to the external portion of the mask while maintaining a fluid tight seal on the assembly.

It is thus an object of the present invention to provide more efficient and better sealing of necessary elements and components so as to alleviate problems encountered in prior art devices.

A further object of the present invention is to provide improved means of voice communication for a user of the device.

Yet another object of the instant invention is to provide a sealing method and resulting seals between elements and components that is leak tight.

An additional object of this invention is to group components and elements such that improved facility of fabrication, lower costs of fabrication, weight reduction and ease of use are accomplished, among other things.

Another important object of the present invention is to eliminate sealing materials that are vulnerable to chemical attack from substances in the operating environment.

In the accomplishment of these and other objects, a sonic welded gas mask is provided with components which employ a unique, convoluted baffle configuration which allows injection molding in one component as opposed to the individual molding of two or more components of the prior art. Obviously the product resulting from this process of manufacture exhibits superiority with respect to economy and weight saving.

A method of fabrication presented in the instant invention formulates means for pre-stretching, anchoring and sealing a diaphragm so as to achieve sufficient tension such that voice vibrations may be transferred from inside the mask to the outside.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like elements throughout and in which:

FIG. 5 is a cross sectional view showing details of the front voicemitter.

FIG. 6 is a fragmentary view showing the front voicemitter installed into the front voicemitter aperture of the elastomeric material of the sonic welded gas mask.

DETAILED DESCRIPTION OF THE INVENTION

Although specific embodiments of the invention will now be described with reference to the drawings, it should be understood that such embodiments are by way of example only and merely illustrative of but a small number of the many possible specific embodiments which can represent applications of the principles of the invention. Various changes and modifications, obvious to one skilled in the art to which the invention pertains, are deemed to be within the spirit, scope and contemplation of the invention as further defined in the appended claims.

Figure 1:
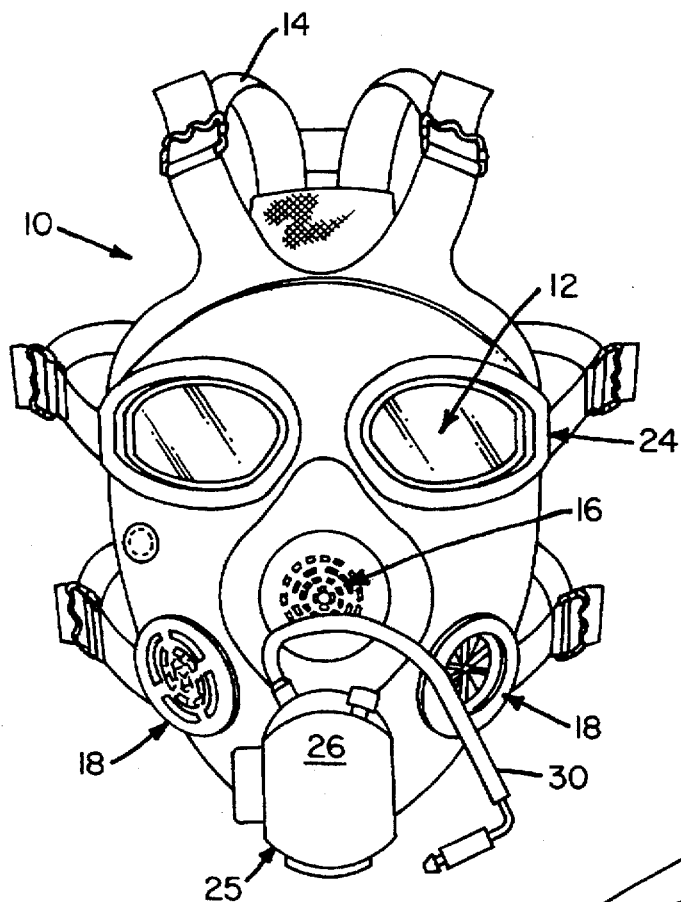
FIG. 1 is a frontal view of the face piece of the sonic welded gas mask showing components installed into the apertures of a molded facepiece of elastomeric material.
Figure 2:
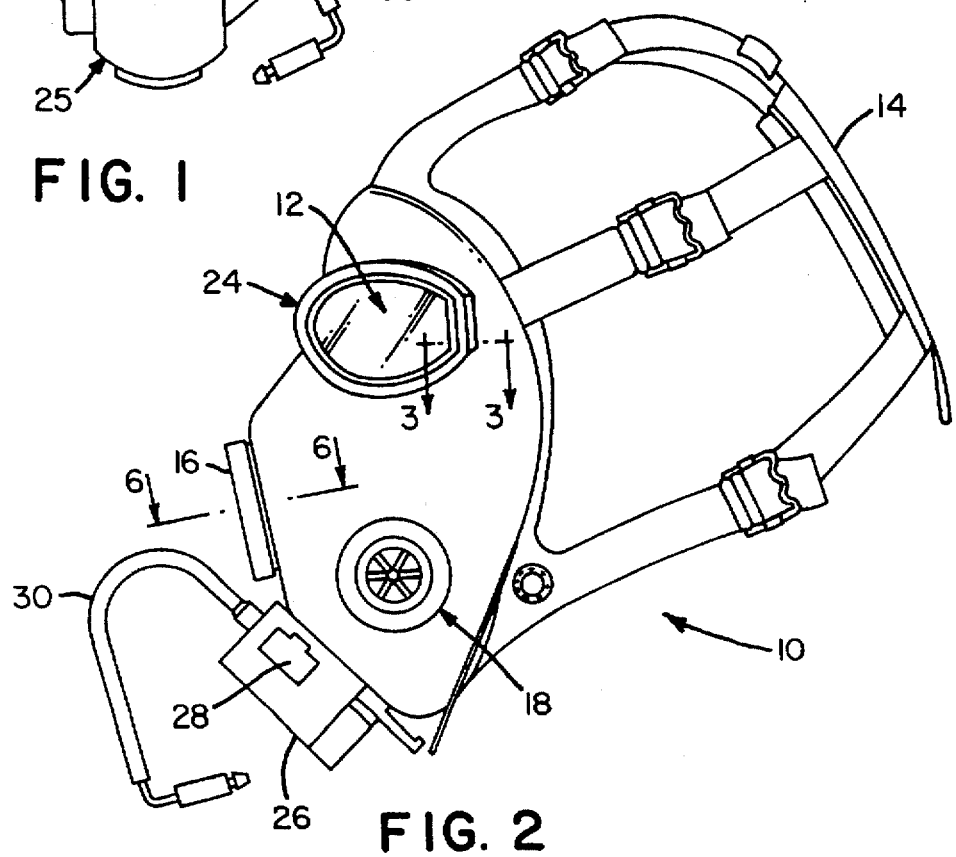
FIG. 2 is a side elevation of the face piece of the sonic welded gas mask showing the head harness in extended configuration.

Referring to FIG. 1 and FIG. 2 with greater particularity, the molded facepiece of the sonic welded gas mask 10 includes apertures, not explicitly shown, however, said apertures being of dimensions and shapes appropriate to components to be received and secured by means of sonic welding therein. Depicted also is a head harness 14 for securing the gas mask to the head of a user. The eyelens 12 is secured into an aperture, molded in the elastomeric material, such as rubber or the like, of the facepiece, by means of eyelens retaining system 24 utilizing the methods of the instant invention. It will be understood in what follows that all of the components installed into the facepiece of the gas mask are installed into apertures that have been provided therein by the molding process. The voicemitter 16 will be shown to be employed by a user for purposes of communication. Ports 18 may be adapted for purposes of voice communication or, alternatively, as is well known in the art, for passage of filtered breathing air to the interior of the mask. The outlet valve system 25 includes items such as exhaust valves, drink tube connections and the like which are well known in the art and which form no part of the instant invention and which, hence, are not shown. Components, not found in the prior art but which may be conveniently housed in the outlet valve housing 26, as contemplated by the instant invention, comprise a voicemitter of the type described hereinafter and particularly described as a front voicemitter or a side voicemitter, and an additional embodiment of which has been described as a modified voicemitter in FIG. 9. The outlet valve housing 26 provides protected access for outlet valve system 25 to the outside environment including the drink tube 30 which may dispense nourishment in liquid form to the mask wearer and for electrical connection as may be needed, a cover for which electrical connector has been denoted by the numeral 28.

Figure 3:
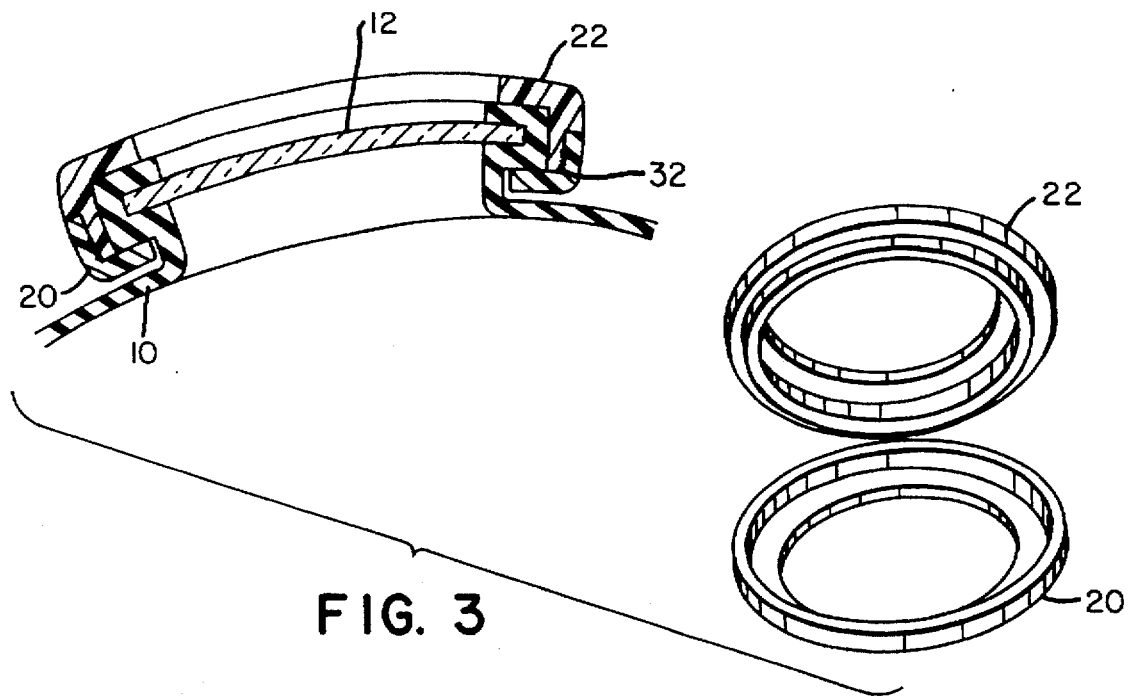
FIG. 3 is a detail illustration of the installation of the eyelens into the eyelens aperture of the sonic welded gas mask facepiece and showing the lens retaining system and its constituent parts.
Figure 4:
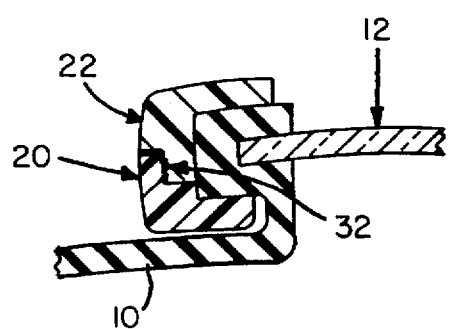
FIG. 4 is a fragmentary enlargement showing the details of the capture of the eyelens within the eyelens aperture of the elastomeric material of the sonic welded gas mask.

Referring now to FIG. 3 and FIG. 4, an eyelens 12 is depicted as having been captured within the aperture provided in the elastomeric material of the facepiece of the sonic welded gas mask, by means of the outside eyelens retaining ring 22 and the inside eyelens retaining ring 20 of the eyelens retainer system 24. The sonic weld 32 for the eyelens retainer system of the method intended by this invention contemplates the sonic welding of two components, 22 and 20, the outside eyelens retainer ring and the inside eyelens retainer ring, respectively so as to entrap the third component, the eyelens 12, therebetween. The sonic welding method employed envisions compressing the elastomeric material of the mask tightly around the eyelens in its aperture so as to provide a fluid tight seal between the mask and the eyelens. Thus, the sonic weld joint 32 is hermetically sealed while the elastomeric material of the mask is squeezed between the components so as to provide a leak-tight seal between the elastomeric material, the material of the eyelens and the lens retaining rings.

In its search of the prior art, applicant found interesting patents directed to and examining sonic welding and applications. Of especial note are:

U.S. Pat. No. 4,230,757, issued Oct. 28, 1980 to J. K. Toner for SONICALLY SECURING ARTICLES IN PLASTIC MOUNTS. The innovative device and method described provided for the application of compressive force along with high frequency vibratory energy to a workpiece.

U.S. Pat. No. 4,558,957 issued Dec. 17, 1985 to E. Mock et al. for PLASTIC WATCH CASING WITH PLASTIC CRYSTAL AND PROCESS FOR JOINING THE CRYSTAL TO THE CASING. This patent explains the partial fusion of thermo-welded parts that ensures permanent connection and the excellent seal formed between the sonically welded components.

U.S. Pat. No. 5,401,342, issued Mar. 28, 1995 to D. E. Vincent et al. for PROCESS AND ENERGY DIRECTOR FOR ULTRASONIC WELDING AND JOINT PRODUCED THEREBY. In this patent document the use of energy directors to improve ultrasonic welding and in particular, the joining of dissimilar materials is explored.

Applicant applauds the prior art and its applications to date, however, applicant avers that, to its knowledge, this is the first time that sonic welding has been used on plastic components in a gas mask application. In what follows, in all parts of this specification and claims, the term welding shall be understood to apply to the art of sonic welding as has been so ably explicated in Toner, Mock et al. and Vincent et al., supra.

Turning now to FIG. 5 and FIG. 6, examination of the front voicemitter 16 may be undertaken. The outside cover of front voicemitter 46 includes a louvered design having offset openings 36. Offset openings 36 are arranged such that any physical object attempting entry into the interior of the voicemitter will be denied that entry by the solid material immediately following each opening. A retaining ring 40 is adapted to register with the outside cover and to be secured thereto by means of a sonic weld for front voicemitter, 34. The outside cover 46 provides physical protection for a plastic film diaphragm in front voicemitter, 38 that is installed between the outside cover and the retaining ring. The innovative method of assembly of the voicemitter components enables pre stretching, anchoring and sealing of the plastic film diaphragm so as to achieve sufficient tension constraint in the film diaphragm that voice vibrations will be transmitted from the inside to the outside of the front voicemitter. In this manner, direct voice communication can be had from a user of the gas mask. Additional sealing safeguards are provided by O-ring 42 and sealing means 44. Referring particularly to FIG. 6, the elastomeric material of the sonic welded gas mask is shown as captured between the retaining ring 40 of the front voicemitter and an inside cover 47 which also provides sealing means 45 and sonic weld 35.

It is contemplated by the present invention that a similar voicemitter be installed in outlet valve system 25 as housed in outlet valve housing 26.

Figure 7:
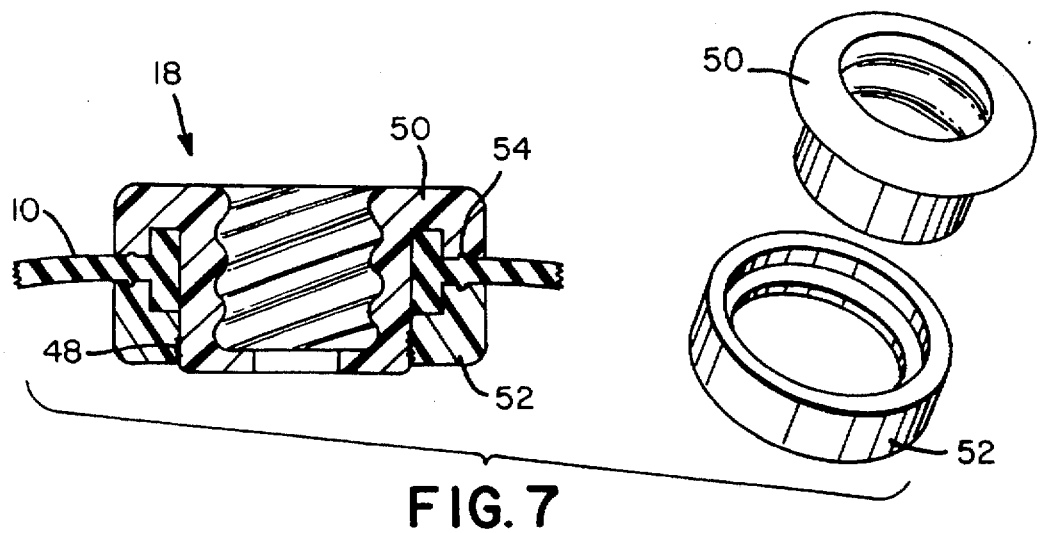
FIG. 7 shows sonic welded members entrapping the elastomeric material of the aperture of the side voicemitter of the facepiece of the gas mask so as to provide a hermetic seal therebetween.

FIG. 7 depicts the elastomeric material of the sonic welded gas mask entrapped between the outer port member, 50 and the inner port member, 52 of a port 18. Sealing means 54 provides sealing while sonic weld 48 provides primary sealing and continuing compression therebetween.

Figure 8:
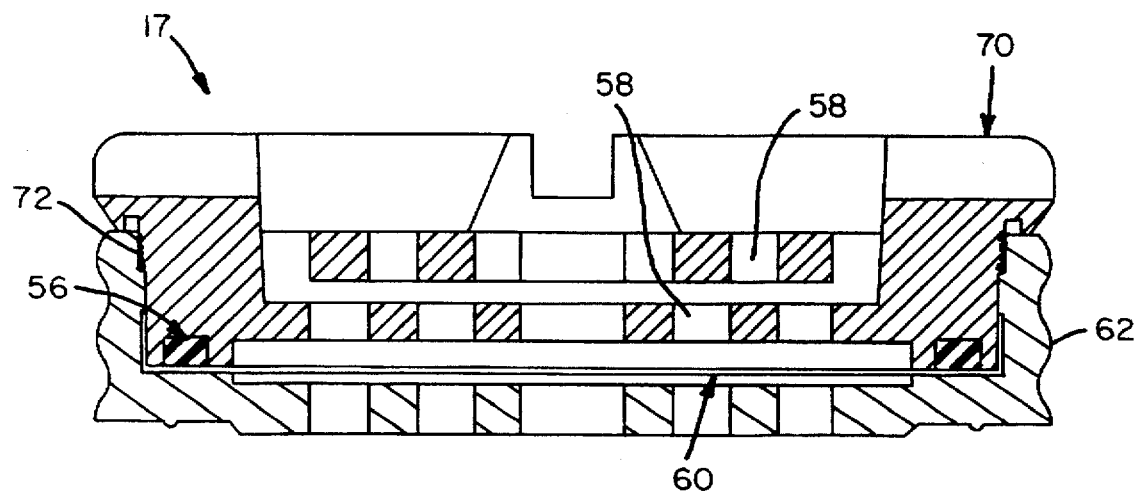
FIG. 8 is a cross sectional view showing the assembly of a side voicemitter by means of sonic welding.

FIG. 8 is a cross sectional detail of side voicemitter 17 which includes a top, 70 having a louvered design for the protection of a plastic film diaphragm 60 in the side voicemitter such as has already been described as used in voice communications. The offset openings in the louvered design of the side voicemitter are denoted by the numeral 58. The threaded member, 62 is intended to be threadedly secured into a port 18 when that port is to be used for communication purposes. Sonic weld 72 provides positive attachment and seal of top member 70 to threaded member 62. O-ring 56 provides additional sealing and fluid-tight integrity.

Figure 9:
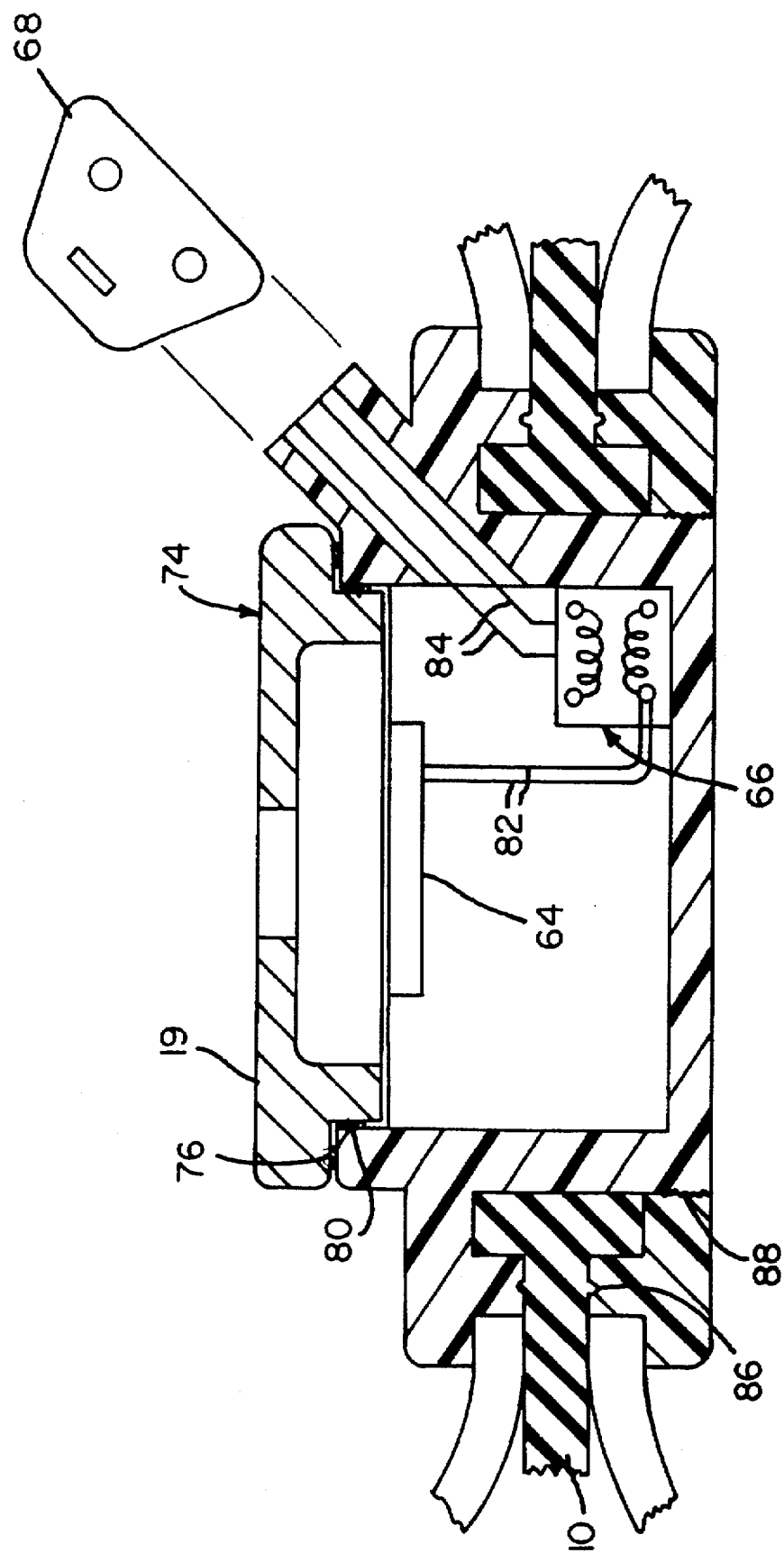
FIG. 9 is a cross sectional view of an alternative voicemitter as contemplated by the invention providing for electronic communication.

FIG. 9 depicts a modified voicemitter showing features of an alternative embodiment of the invention that enable communications based on electronic means. A piezoelectric film, 64 is shown attached to a captured plastic film diaphragm 78 in a modified voicemitter, 19, intended to be situated within outlet valve housing 26. The modified voicemitter includes a transformer, 66 contemplated as operating upon a vibrating voice signal as developed by the piezoelectric film so as to render that signal useful for electronic communication. The modified voicemitter 19 comprises a top member 74 which cooperates with a retaining ring 76 to capture the plastic film diaphragm 78 therebetween. A sonic weld 80 maintains sealing and continuing stretching constraint upon the plastic diaphragm. Electrical connecting leads 82 provide electrical connection between the piezoelectric film 64 and transformer 66. Electrical connection leads 84 provide external electrical connection to an external signal processor or the like for further modification and transmission. Such external modification and transmission are well known in the art and are not intended to form any part of the instant invention. A cover gasket 68 is intended to indicate a possible configuration for such an electrical connection but is not intended to be a limiting factor therefor. An inside cover 86 acting in cooperation with retaining ring 76 and sonic weld 88 provides positive sealing and continuing compression between the modified voicemitter and the elastomeric material of the gas mask.

ABSTRACT OF THE DRAWINGS

In the drawings, the numerals refer to like parts and for the purpose of explication, set forth below are the numbered parts of the sonic welded gas mask of this invention.

| NUMERAL | ELEMENT | In FIGS. |
| --- | --- | --- |
| 10 | facepiece of the sonic welded gas mask generally | 1, 2 |
| 12 | eyelens | 1, 2, 3, 4 |
| 14 | head harness | 1, 2 |
| 16 | voicemitter | 1, 2, 5, 6 |
| 17 | side voicemitter | 7, 8 |
| 18 | port | 1, 2, 7 |
| 19 | modified voicemitter | 9 |
| 20 | inside eyelens retainer ring | 3, 4 |
| 22 | outside eyelens retainer ring | 3, 4 |

7

-continued

| NUMERAL | ELEMENT | In FIGS. |
|---|---|---|
| 24 | eyelens retainer system | 1, 2 |
| 25 | outlet valve system | 1 |
| 26 | outlet valve housing | 1, 2 |
| 28 | electrical connector cover | 2 |
| 30 | drink tube | 1, 2 |
| 32 | sonic weld for lens retainer system | 3, 4 |
| 34 | sonic weld for front voicemitter | 5, 6 |
| 35 | sonic weld for mask | 6 |
| 36 | offset openings in louvre design of front voicemitter | 5, 6 |
| 38 | plastic film diaphragm in front voicemitter | 5, 6 |
| 40 | retaining ring | 5, 6 |
| 42 | O-ring in front voicemitter | 5, 6 |
| 44 | sealing means in retaining ring of front voicemitter | 5 |
| 45 | sealing means in inside cover | 6 |
| 46 | outside cover of front voicemitter | 5, 6 |
| 47 | inside cover of front voicemitter | 6 |
| 48 | sonic weld for side port | 7 |
| 50 | outer port member | 7 |
| 52 | inner port member | 7 |
| 54 | sealing means for port | 7 |
| 56 | O-ring for side voicemitter | 8 |
| 58 | offset openings in louvre design of side voicemitter | 8 |
| 60 | plastic film diaphragm in side voicemitter | 8 |
| 62 | threaded member | 8 |
| 64 | piezo film | 9 |
| 66 | transformer | 9 |
| 68 | cover gasket for electrical connector | 9 |
| 70 | top member of side voicemitter | 8 |
| 72 | sonic weld for side voicemitter | 8 |
| 74 | top member for modified voicemitter | 9 |
| 76 | retaining ring | 9 |
| 78 | plastic film diaphragm | 9 |
| 80 | sonic weld | 9 |
| 82 | internal conducting leads | 9 |
| 84 | external connecting leads | 9 |
| 86 | inside cover | 9 |
| 88 | sonic weld | 9 |

Thus, there has been described a sonic welded gas mask that will facilitate communication directly by voice or by electronic means, provide firm sealing security of components into the facepiece, be leak proof and resist tampering, among other benefits. Great improvements in reliability, flexibility, maintainability, ease of operation, facility of fabrication, and economy, among other things, have been provided through the novel advantages of the invention.

It is pointed out that although the present invention has been shown and described with reference to particular embodiment, nevertheless, various changes and modifications, obvious to one skilled in the art to which the invention pertains, are deemed to lie within the purview of the invention.

8

What is claimed and desired to be secured by Letters Patent of the United States is:

1. A method of fabricating a sonic welded gas mask, comprising the steps of:
   molding a facepiece of elastomeric material;
   providing gas mask components to be sealed by sonic welding into said facepiece;
   wherein said step of providing gas mask components comprises the further steps of:
   providing a voicemitter;
   welding said voicemitter into one of said apertures;
   wherein said further step of providing a voicemitter comprises the still further steps of:
   providing a front voicemitter;
   providing a louvered outside cover to said front voicemitter;
   providing offset openings in said outside cover so as to admit voice transmission therethrough;
   providing a retaining ring;
   providing a plastic film diaphragm entrapped between said outside cover and said retaining ring, protected by said outside cover and stretchingly constrained so as to be able to transmit voice vibrations from inside said mask to the outside environment;
   welding said outside cover, said retaining ring and said plastic film diaphragm so as to provide positive seal between said outside cover and said retaining ring and maintaining sealing and continuing stretching constraints upon said plastic film diaphragm; and
   welding said gas mask components into said facepiece.

2. A method of fabricating a sonic welded gas mask, comprising the steps of:
   molding a facepiece of elastomeric material;
   providing gas mask components to be sealed by sonic welding into said facepiece;
   wherein said step of providing gas mask components comprises the further steps of:
   providing a voicemitter;
   welding said voicemitter into one of said apertures;
   wherein said further step of providing a voicemitter comprises the still further steps of:
   providing a front voicemitter;
   providing a louvered outside cover to said front voicemitter;
   providing offset openings in said outside cover so as to admit voice transmission therethrough;
   providing a retaining ring;
   providing a plastic film diaphragm entrapped between said outside cover and said retaining ring, protected by said outside cover and stretchingly constrained so as to be able to transmit voice vibrations from inside said mask to the outside environment;
   welding said outside cover, said retaining ring and said plastic film diaphragm so as to provide positive seal between said outside cover and said retaining ring and maintaining sealing and continuing stretching constraints upon said plastic film diaphragm;
   providing an inside cover;
   welding said inside cover, said retaining ring and said elastomeric material in cooperation so as to provide primary sealing and continuing compression upon said elastomeric material as applied between said inside cover and said retaining ring; and welding said gas mask components into said facepiece.

3. The method of fabricating a sonic welded gas mask, comprising the steps of:

molding a facepiece of elastomeric material;

providing an outlet valve system;

providing a voicemitter in said outlet valve system;

wherein said step of providing a voicemitter comprises the further steps of:

providing a modified voicemitter;

providing a top member of said voicemitter;

providing a retaining ring for said voicemitter;

providing a plastic film diaphragm;

entrapping said plastic film diaphragm between said top member and said retaining ring;

providing a piezoelectric film to generate electric signal responsive to voice vibrations;

attaching said piezoelectric film to said plastic film;

welding said top member in cooperation with said retaining ring so as to provide a positive seal between said top member and said retaining ring;

providing electrical circuit means to process and direct signal output from said piezoelectric film;

providing an inside cover;

welding said retaining ring to said inside cover so as to entrap a portion of said elastomeric material therebetween and provide primary sealing and continuing compression upon said elastomeric material;

providing an outlet valve housing for covering and protecting said outlet valve system;

welding said outlet valve system, said voicemitter in said outlet valve system and said outlet valve housing in cooperation into said facepiece.

4. The method of fabricating a sonic welded gas mask, comprising the steps of:

molding a facepiece of elastomeric material;

providing an outlet valve system;

providing a voicemitter in said outlet valve system;

wherein said step of providing a voicemitter comprises the further steps of:

providing a modified voicemitter;

providing a top member of said voicemitter;

providing a retaining ring for said voicemitter;

providing a plastic film diaphragm;

entrapping said plastic film diaphragm between said top member and said retaining ring;

providing a piezoelectric film to generate electric signal responsive to voice vibrations;

attaching said piezoelectric film to said plastic film;

welding said top member in cooperation with said retaining ring so as to provide a positive seal between said top member and said retaining ring;

providing electrical circuit means to process and direct signal output from said piezoelectric film;

wherein provision of said electric circuit means comprises the further steps of providing a transformer;

connecting electrical leads from said piezoelectric film to said transformer;

providing electrical leads from said transformer to an external connector;

providing an inside cover;

welding said retaining ring to said inside cover so as to entrap a portion of said elastomeric material therebetween and provide primary sealing and continuing compression upon said elastomeric material;

providing an outlet valve housing for covering and protecting said outlet valve system; and welding said outlet valve system, said voicemitter in said outlet valve system and said outlet valve housing in cooperation into said facepiece.

5. A method of fabricating a sonic welded gas mask, comprising the steps of:

molding a facepiece of elastomeric material;

providing at least one port;

welding said at least one port into said facepiece;

providing a side voicemitter;

wherein the step of providing a side voicemitter comprises the further steps of:

providing a louvered top member;

providing openings in said top member for voice transmission therethrough;

providing a threaded member;

providing a plastic film diaphragm;

pre stretching said plastic film diaphragm;

entrapping said stretched plastic film diaphragm between said top member and said threaded member;

welding said top member to said threaded member so as to maintain sealing and continuing stretching constraints upon said plastic film diaphragm; and securing said side voicemitter into said port.

* * * * *